United States Patent
Yanagisawa (10) Patent No.: US 7,317,273 B2
(45) Date of Patent: Jan. 8, 2008

(54) ELECTROMAGNETIC ACTUATOR AND PORTABLE DEVICE HAVING THE SAME

(75) Inventor: Shigeru Yanagisawa, Chiba (JP)

(73) Assignee: SEIKO Precision Inc., Narashino-shi, Chiba (JP)

( * ) Notice: Subject to any disclaimer, the term of this patent is extended or adjusted under 35 U.S.C. 154(b) by 270 days.

(21) Appl. No.: 10/975,188

(22) Filed: Oct. 27, 2004

(65) Prior Publication Data

US 2005/0110364 A1    May 26, 2005

(30) Foreign Application Priority Data

Oct. 29, 2003    (JP)    ............................. 2003-368600

(51) Int. Cl.
*H02K 1/00* (2006.01)
(52) U.S. Cl. .................................... 310/181; 310/68 B
(58) Field of Classification Search ............. 310/181, 310/68 B, 154.02, 154.05, 154.32, 154.33, 310/154.47, 156.32, 156.34, 156.37
See application file for complete search history.

(56) References Cited

U.S. PATENT DOCUMENTS

| 4,465,950 A | * | 8/1984 | Guttinger ...................... 310/162 |
| 4,978,878 A | * | 12/1990 | Dijken ......................... 310/268 |
| 2005/0242679 A1 | * | 11/2005 | Walter et al. ................. 310/181 |

* cited by examiner

*Primary Examiner*—Dang Le
(74) *Attorney, Agent, or Firm*—Townsend and Townsend and Crew LLP (57) ABSTRACT

An electromagnetic actuator includes a cylindrical stator made of a permanent magnet and having annular end faces magnetized to plural magnetic poles, a coil securely disposed in a hollow portion of the stator via a bobbin on which the coil is wound and which is fixed to the stator's hollow portion, a rotary shaft put through the coil in the direction of the center axis thereof in such a way as to be rotatably supported at the bobbin, and a rotor of a soft magnetic material provided in such a way as to rotate together with the rotary shaft and having plural rotor arms radially extending from both end portions of the rotary shaft and facing the respective annular end faces of the stator.

5 Claims, 8 Drawing Sheets

ELECTROMAGNETIC ACTUATOR AND PORTABLE DEVICE HAVING THE SAME

CROSS-REFERENCES TO RELATED APPLICATIONS

This application claims priority to Japanese Patent Application No. 2003-368600 filed on Oct. 29, 2003, which is incorporated herein by reference for all purposes.

BACKGROUND OF THE INVENTION

1. Field of the Invention

The present invention relates to an electromagnetic actuator which rotates with a 1-phase excitation driving method, and a portable device having the electromagnetic actuator.

2. Description of the Related Art

There has been proposed a brushless motor as a DC motor, which has a rotor made of a permanent magnet and a stator made by a coil provided in the circumferential direction about the rotational axis of the rotor or the permanent magnet.

As the conventional brushless motor has the stator coil arranged in the circumferential direction about the rotational axis of the rotor in such a way as to surround the rotor, it is restricted on its mount space in the radial direction.

BRIEF SUMMARY OF THE INVENTION

Accordingly, it is an object of the invention to provide an electromagnetic actuator which is less restricted on its mount space in the radial direction, and a portable device having the electromagnetic actuator.

To achieve the object, according to one aspect of the invention, there is provided an electromagnetic actuator which comprises a cylindrical stator permanent magnet having annular end faces magnetized to a plurality of magnetic poles; a coil securely disposed inside a hollow interior of the stator; a rotary shaft put through the coil in a direction of a center axis thereof in such a way as to be rotatably supported; and a rotor of a soft magnetic material having a plurality of rotor arms facing the annular end faces of the stator and provided in such a way as to rotate together with the rotary shaft.

The rotor is disposed at at least one of the annular end faces of the stator.

More practically, the rotor arms include at least two main rotor arms and at least one rotational-direction determining rotor arm which extend in a direction of the annular end faces of the stator from both end portions of the rotary shaft and face the annular end faces, the at least one rotational-direction determining rotor arm is less in quantity than the main rotor arms rotor, those rotor arms which are disposed at one of the annular end faces are arranged in phase with magnetic poles of the facing annular end face, those rotor arms which are disposed at the other annular end face are arranged in an opposite phase to the phase with respect to magnetic poles of the facing annular end face, and the rotational-direction determining rotor arm is so arranged as to be shifted by a given angle with respect to the magnetic poles of the facing annular end face.

Alternatively, the rotor arms include at least two main rotor arms and at least one rotational-direction determining rotor arm which extend in a direction of the annular end faces of the stator from both end portions of the rotary shaft and face the annular end faces, the at least one rotational-direction determining rotor arm is less in quantity than the main rotor arms rotor, those rotor arms which are disposed at each one of the annular end faces are arranged in phase with magnetic poles of the facing annular end face, and the rotational-direction determining rotor arm is so arranged as to be shifted by a given angle from the phase with respect to the magnetic poles of the facing annular end face.

The rotational-direction determining rotor arm may be formed as a separate member from the main rotor arms.

The rotor arms which are disposed at the one of the annular end faces may include four rotor arms arranged at angles of 90 from one another, the rotor arms which are disposed at the other annular end face may include three rotor arms in such a way that angles defined by a center one of the three rotor arms and the other two rotor arms are 90 degrees, and the rotational-direction determining rotor arm may be arranged at the other annular end face between the other two rotor arms.

The electromagnetic actuator further comprises a coil bobbin on which the coil is wound and which is secured to the hollow interior of the stator, and the coil bobbin constitutes a bearing which supports the rotary shaft in a rotatable manner.

In the electromagnetic actuator, when an alternate current or a current whose positive and negative polarities are switched in arbitrary periods is supplied to the coil, the rotor rotates stepwise in a same direction in units of the magnetic poles every time a direction of the current is changed.

According to another aspect of the invention, there is provided a portable device having an electromagnetic actuator which comprises a cylindrical stator permanent magnet having annular end faces magnetized to a plurality of magnetic poles; a coil securely disposed inside a hollow interior of the stator; a rotary shaft put through the coil in a direction of a center axis thereof in such a way as to be rotatably supported; and a rotor of a soft magnetic material having a plurality of rotor arms facing the annular end faces of the stator and provided in such a way as to rotate together with the rotary shaft.

In the portable device, the rotor arms include at least two main rotor arms and at least one rotational-direction determining rotor arm which extend in a direction of the annular end faces of the stator from both end portions of the rotary shaft and face the annular end faces, the at least one rotational-direction determining rotor arm is less in quantity than the main rotor arms rotor, those rotor arms which are disposed at one of the annular end faces are arranged in phase with magnetic poles of the facing annular end face, those rotor arms which are disposed at the other annular end face are arranged in an opposite phase to the phase with respect to magnetic poles of the facing annular end face, and the rotational-direction determining rotor arm is so arranged as to be shifted by a given angle with respect to the magnetic poles of the facing annular end face.

The electromagnetic actuator according to the invention is less restricted on its mount space in the radial direction and generates a sufficient rotational torque with 1-phase excitation.

As the moment of inertia of the rotor is small, the power consumed when the electromagnetic actuator is driven can be reduced.

The portable device according to the invention can be made more compact and lighter.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE INVENTION

Electromagnetic actuators according to preferred embodiments of the invention will be described below with reference to the accompanying drawings.

Figure 1:
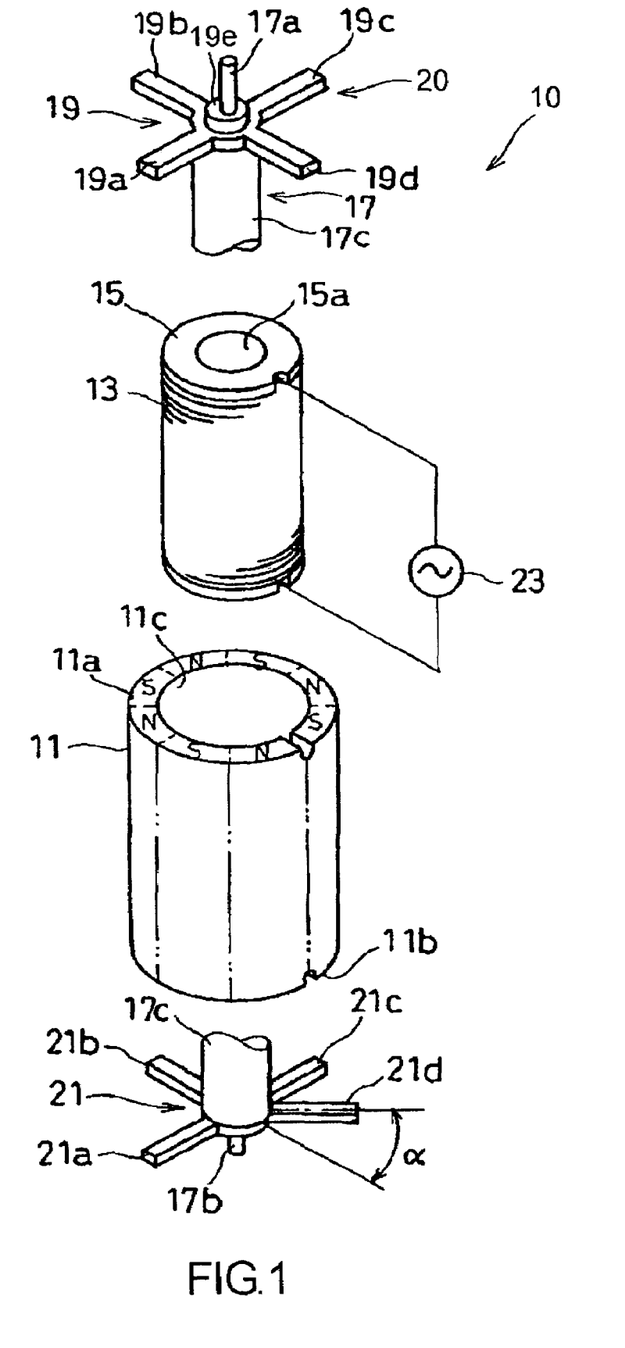
FIG. 1 is an exploded perspective view of an electromagnetic actuator according to one embodiment to which the invention is adapted.

FIG. 1 shows an example of the structure of an electromagnetic actuator according to one embodiment of the invention.

As shown in FIG. 1, the electromagnetic actuator includes a cylindrical stator 11 made of a permanent magnet and having annular end faces 11a and 11b magnetized to a plurality of magnetic poles, a coil 13 securely disposed in a hollow portion 11c of the stator 11 via a bobbin 15 on which the coil 13 is wound and which is fixed to the hollow portion 11c of the stator 11, a rotary shaft 17 which is put through the coil 13 in the direction of the center axis thereof in such a way as to be rotatably supported at the bobbin 15, and a rotor 20 of a soft magnetic material which is provided in such a way as to rotate together with the rotary shaft 17 and has a plurality of rotor arms 19 (19a to 19d) and 21 (21a to 21d) radially extending from both end portions of the rotary shaft 17 and facing the respective annular end faces 11a and 11b of the stator 11. The coil 13 is wound on a cylindrical bobbin 15 made of an insulator, which serves as a bearing to support the rotary shaft 17 in a rotatable manner. The rotary shaft 17 is put through a hollow portion 15a of the bobbin 15 so as to be rotatably supported. The bearing and the bobbin may be formed as separate members.

The cylindrical stator 11 is formed of a ferromagnetic material, and is magnetized in the perpendicular direction to both annular end faces 11a and 11b. The stator 11 is constituted by a plurality of permanent magnet portions lying at equal intervals in the circumferential direction in such a way as to surround the hollow portion 11c. That is, magnetic poles of plural permanent magnets extending in the radial direction are present alternately on both annular end faces 11a and 11b of the stator 11.

The number of the magnets or the number of segments, n, is an even number, and is "8" in this embodiment. In other words, eight S/N poles are alternately arranged at equal intervals of 45° on the annular end faces 11a and 11b of the stator 11.

Figure 8:
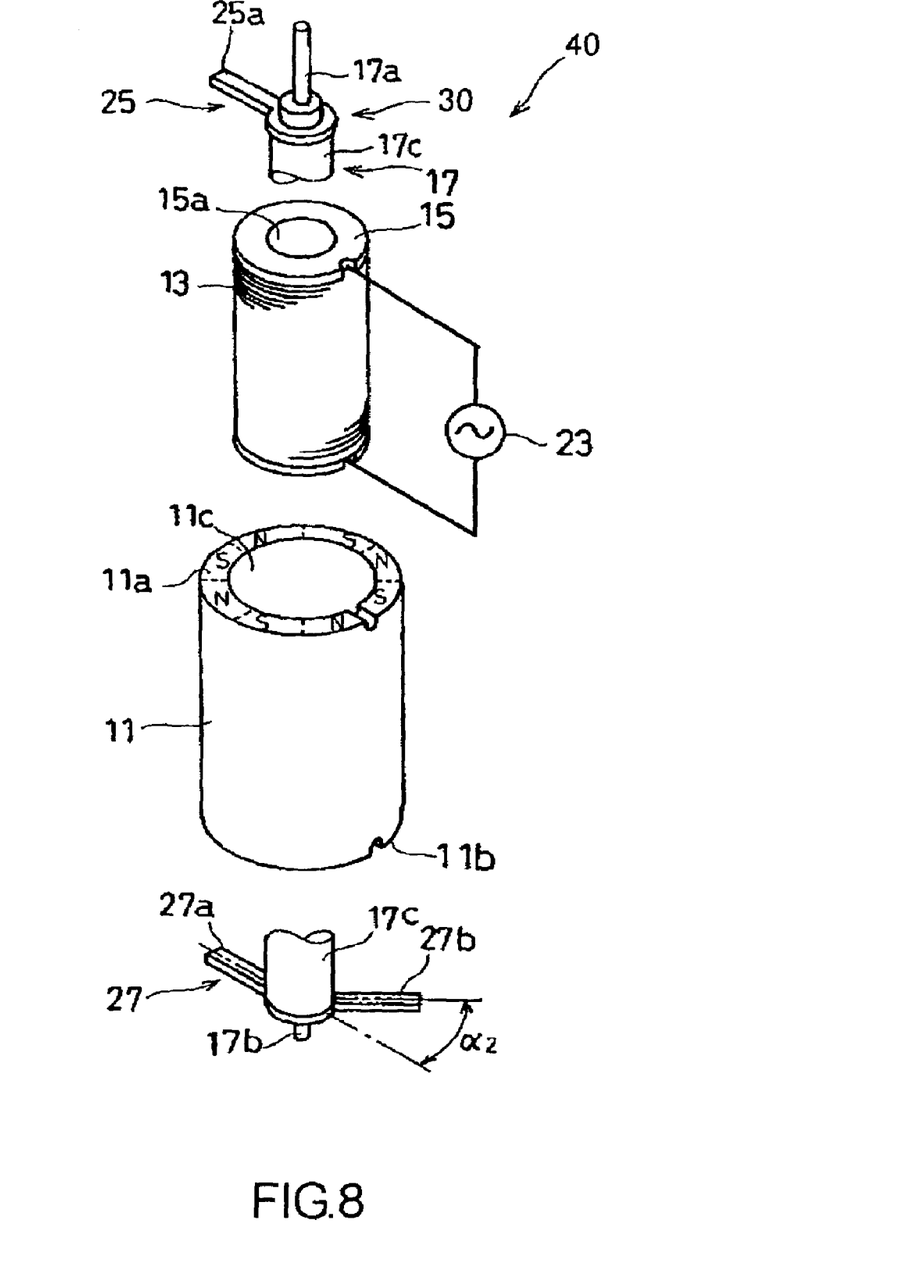
FIG. 8 is an exploded perspective view of an electromagnetic actuator according to another embodiment to which the invention is adapted.

The rotary shaft 17 has a shaft portion 17c, which is so supported as to rotate smoothly and without shaking, and drive shafts 17a and 17b of small diameters coaxially protruding from both end portions of the shaft portion 17c. The first and second rotor arms 19 and 21 are fixed to near the boundaries between the shaft portion 17c and the drive shafts 17a and 17b which protrude from the first and second rotor arms 19 and 21 in the axial direction. In FIGS. 1 and 8, the vicinity of the center portion of the shaft portion 17c is omitted for the sake of easier illustration.

The first rotor arm 19 has 4-pole main rotor arms 19a, 19b, 19c and 19d formed in a cross shape and arranged at equal intervals about the rotary shaft 17. The angle that is defined by each of the main rotor arms 19a, 19b, 19c and 19d and an adjoining one of the remaining rotor arms is 90°. That is, the main rotor arms 19a to 19d are formed in such a way as to be in phase with respect to the magnetic poles of the facing or associated annular end face 11a of the stator 11. A boss portion 19e is formed at the first rotor arm 19, which is secured to the rotary shaft 17 as the boss portion 19e is press-fitted over the drive shaft 17a.

The second rotor arm 21 has 4-pole rotor arms, namely 3-pole main rotor arms 21a, 21b and 21c formed in a T shape about the rotary shaft 17, and a 1-pole rotational-direction determining rotor arm 21d extending to the opposite side to the main rotor arm 21b from between the main rotor arms 21a and 21c extending in the diametrical direction. The 3-pole main rotor arms 21a to 21c are formed at equal intervals in such a way that the main rotor arms 21a and 21c form 90° with respect to the center main rotor arm 21b. The rotational-direction determining rotor arm 21d is formed at an angle different from 90° with respect to the main rotor arm 21a or 21c. That is, the main rotor arms 21a to 21c are arranged in such a way as to be in phase with the magnetic poles of the associated annular end face 11b of the stator 11, and the rotational-direction determining rotor arm 21d is arranged in such a way as to be shifted by a predetermined angle (offset angle α) with respect to that phase.

Figure 2:
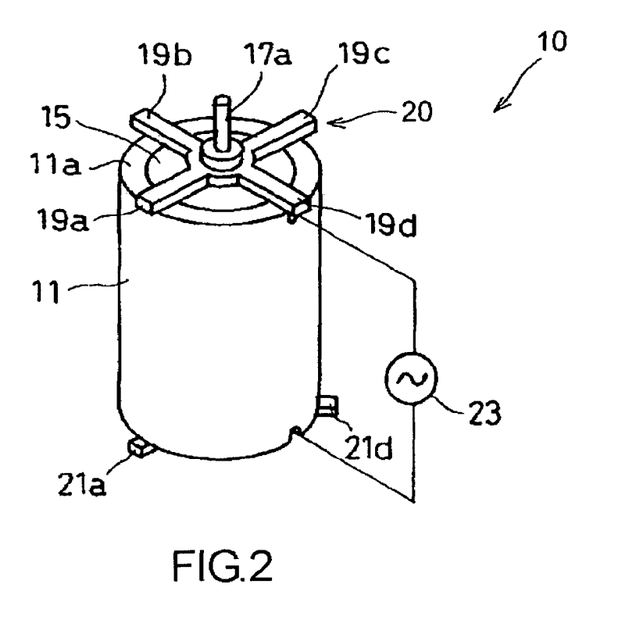
FIG. 2 is a perspective view of the electromagnetic actuator in FIG. 1 assembled and as seen from the front side.
Figure 3:
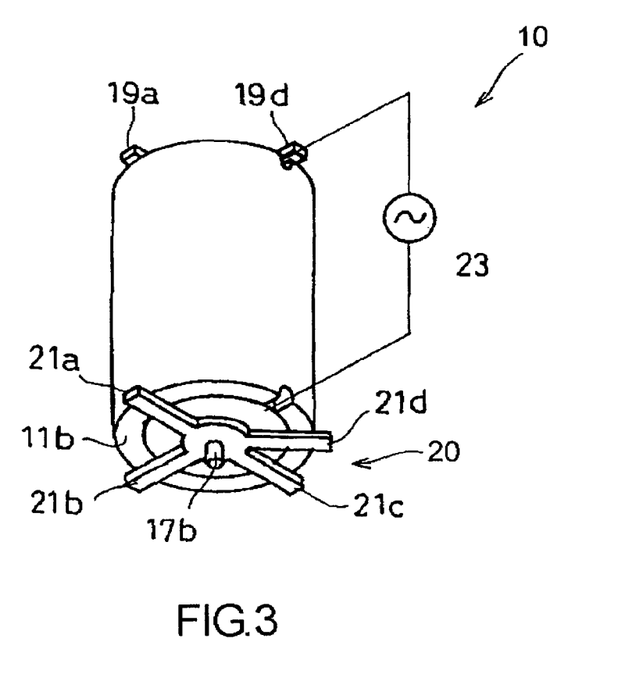
FIG. 3 is a perspective view of the electromagnetic actuator in FIG. 1 assembled and as seen from the rear side.

FIGS. 2 and 3 show in perspective views as seen from the front side and the rear side respectively, the assembled electromagnetic actuator according to the embodiment in which the bobbin 15 having the coil 13 wound thereon is securely inserted into the hollow portion 11c of the stator 11, the rotary shaft 17 is inserted into the hollow portion 15a of the bobbin 15, and the first rotor arm 19 is fixed to the end portion of the rotary shaft 17 protruding from the bobbin 15.

The second rotor arm 21 is formed integrally with the rotary shaft 17, while the first rotor arm 19 is formed as a separate member from the rotary shaft 17. The first rotor arm 19 formed as a separate member is fixed after the rotary shaft 17 is put through the bobbin 15. At this time, the first rotor arm 19 and the second rotor arm 21 are secured and arranged in such a way that the phase of the main rotor arms 21a to 21c become opposite to the phase of the main rotor arms 19a to 19c (in such a way that the main rotor arms 19a to 19c overlap the respective main rotor arms 21a to 21c in projection in the axial direction of the rotary shaft 17 in the embodiment). The second rotor arm 21 can be formed as a separate member from the rotary shaft 17, the first rotor arm 19 can be formed integrally with the rotary shaft 17, or the first and second rotor arms 19 and 21 can both be formed as separate members from the rotary shaft 17.

The rotor arms 19a to 19d and 21a to 21d, and the annular end faces 11a and 11b of the stator 11 are formed in parallel to each other and to have smooth flat surfaces. For example, with spacers intervened between the first and second rotor arms 19 and 21 and the bobbin 15, the rotor arms 19a to 19d and 21a to 21d are separated from the annular end faces 11a and 11b of the stator 11 by a predetermined distance and in a contactless manner.

The electromagnetic actuator according to the embodiment is constructed in such a way that when an alternate current or a current whose positive and negative polarities are switched in arbitrary periods is supplied to the coil 13 from a power supply 23, the first and second rotor arms 19 and 21 and the rotary shaft 17 rotate stepwise in the same direction in units of magnetic poles every time the direction of the current is changed. The torque is transmitted to outside via the drive shafts 17a and 17b protruding from both ends of the electromagnetic actuator.

The rotational-direction determining rotor arm 21d in the embodiment is formed in such a way as to be shifted by a predetermined offset angle α from the angle of 90° that is defined by the adjoining main rotor arms 21a to 21c. The offset angle α determines whether to rotate the electromagnetic actuator rightward or leftward. The offset angle α in the embodiment is set to α=22.5° so that the angle defined between the rotational-direction determining rotor arm 21d and the main rotor arm 19c becomes smaller than the pitch angle of 90°. This angle setting allows the first and second rotor arms 19 and 21 and the rotary shaft 17 (17a to 17c) to rotate rightward.

While the integral formation of the rotor arms 19a to 19d of the first rotor arm 19 and the rotor arms 21a to 21d of the second rotor arm 21 can improve the assembling efficiency, such as making adjusting among arms unnecessary, the rotor arms may be formed as separate members. The main rotor arms 21a to 21c of the second rotor arm 21 may be formed integrally, while only the rotational-direction determining rotor arm 21d is formed separately. This structure can ensure adjustment of the maximum rotational speed or so and switching of the rotational direction by adjusting the phase at the time the rotational-direction determining rotor arm 21d is secured.

The widths of the rotor arms 19a to 19d and 21a to 21d are set in such a way as to be narrower than the circumferential width of the magnetic poles on the annular end faces 11a and 11b of the stator 11 (the innermost width). While the rotor arms 19a to 19d and 21a to 21d may have equal widths, they may be so formed in a fan shape as to become wider outward.

The rotational operation of the electromagnetic actuator 10 will be described referring to operational charts shown in FIGS. 4A to 4D and 5A to 5E. Those diagrams FIGS. 4A to 4D show the stator 11 and the first and second rotor arms 19 and 21 developed linearly and show the rotor arms 19a to 19d and 21a to 21d of the first and second rotor arms 19 and 21 at positions corresponding to the annular end faces 11a and 11b of the developed stator 11. In FIGS. 4A to 4D and 5A to 5E, the rightward direction corresponds to the rightward rotational direction of the first and second rotor arms 19 and 21, and the angles given in the diagrams indicate the rotational angles of the first and second rotor arms 19 and 21.

Figure 4A:
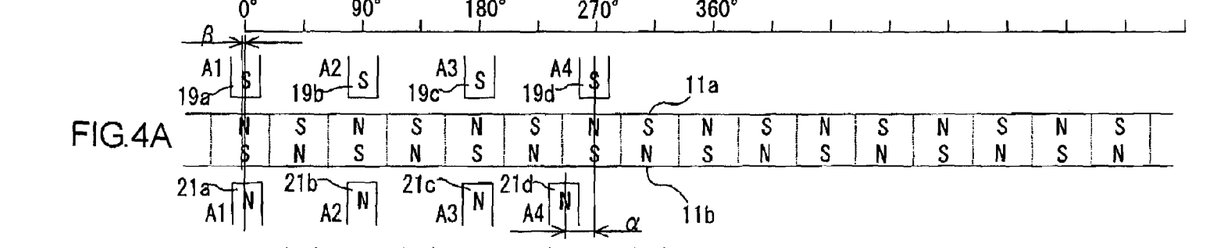
FIGS. 4A to 4D are diagrams of a stator and rotor arms developed linearly for explaining the operation of the electromagnetic actuator in FIG. 1.

It is assumed that the first and second rotor arms 19 and 21 are initially held at a stable (stationary or balanced) position as shown in FIG. 4A. At this stable position the rotational moment to rotate the 4-pole main rotor arms 19a to 19d of the first rotor arm 19 and the 3-pole main rotor arms 21a to 21c of the second rotor arm 21 to the stable state by the repulsive/attracting force acting between those rotor arms and the magnetic poles of the associated annular end faces 11a and 11b is balanced with the rotational moment to rotate the rotational-direction determining rotor arm 21d to the stable state by the repulsive/attracting force acting between the rotational-direction determining rotor arm 21d and the magnetic poles of the associated annular end face 11b. The rotor arms 19a to 19d and 21a to 21d in the illustrated embodiment are rotated rightward or moved rightward in the diagram by a minute angle β from the stable position in case where the rotational-direction determining rotor arm 21d is not present, and are stopped there. In this way, the action of the rotational-direction determining rotor arm 21d holds the first and second rotor arms 19 and 21 to a state slightly turned rightward from the stable position that is achieved by only the main rotor arms 19a to 19d and the main rotor arms 21a to 21c.

Figure 4B:
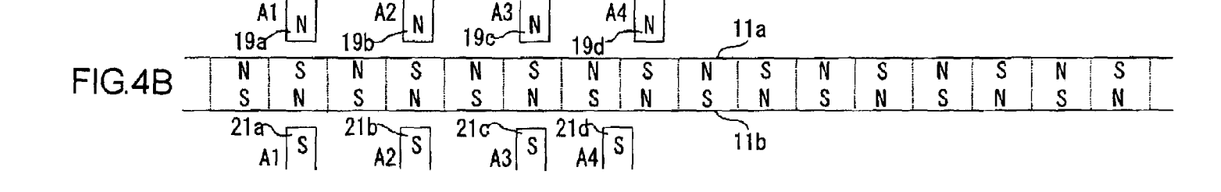

When the forward current flows across the coil 13 at the stable position of the first and second rotor arms 19 and 21 shown in FIG. 4A, the rotor arms 19a to 19d are magnetized to the N pole and the rotor arms 21a to 21d are magnetized to the S pole as shown in FIG. 4B. Then, the main rotor arms 19a to 19d, and the rotor arms 21a to 21d are rotated rightward by attraction of the closest S pole on the annular end face 11a and the closest N pole on the annular end face 11b by one step (45°) and are stopped at the stable position (FIG. 4B). If the current to the coil 13 is cut off then, the rotor arms 19a to 19d and 21a to 21d are held at the stable position.

Figure 4C:
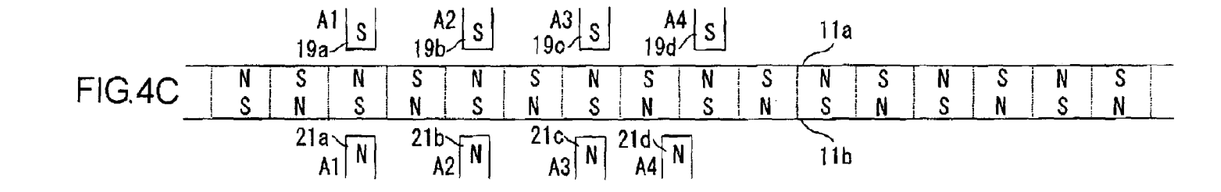
Figure 4D:
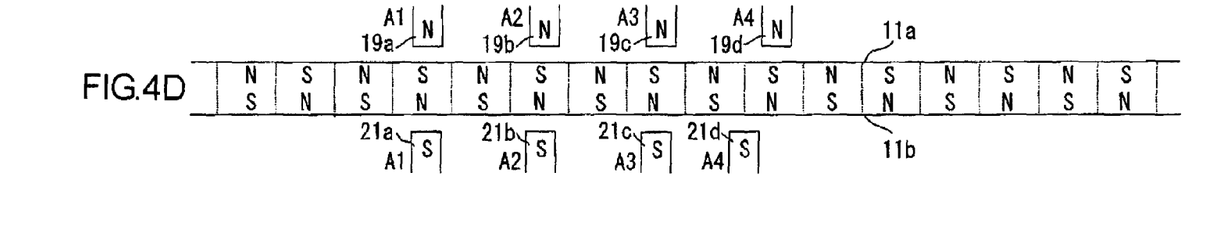
Figure 5A:
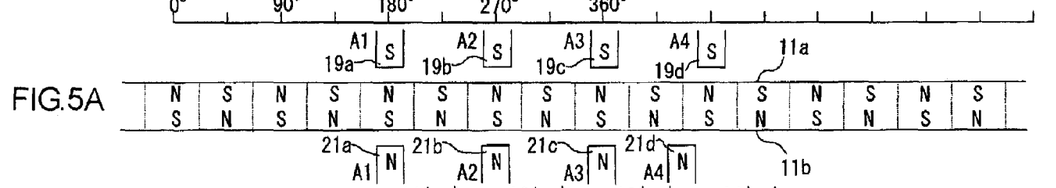
FIGS. 5A to 5E are diagrams of the stator and rotor arms developed linearly for explaining the operation of the electromagnetic actuator in FIG. 1.
Figure 5B:
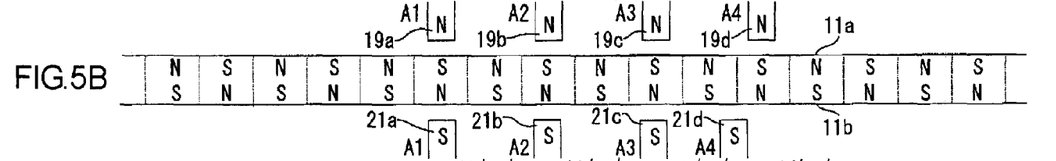
Figure 5C:
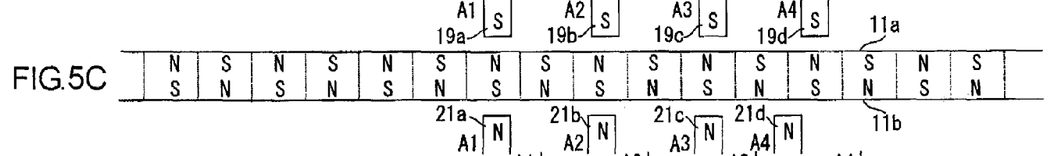
Figure 5D:
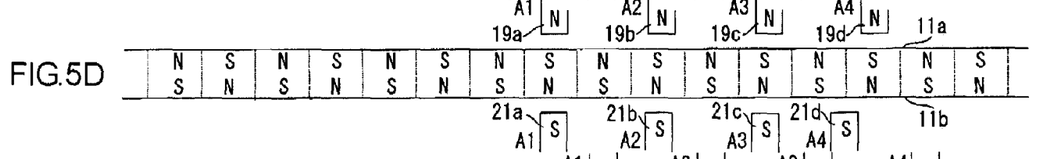
Figure 5E:
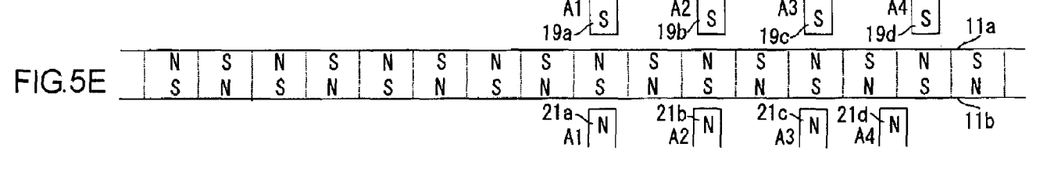

When the reverse current flows across the coil 13 at the stable position of the first and second rotor arms 19 and 21 shown in FIG. 4B, the magnetic poles of the main rotor arms 19a to 19d and the rotor arms 21a to 21d are inverted, so that the main rotor arms 19a to 19d are magnetized to the S pole and the rotor arms 21a to 21d are magnetized to the N pole as shown in FIG. 4C. Then, the main rotor arms 19a to 19d are attracted to the closest N pole on the associated annular end face 11a in the rotational direction, and the rotor arms 21a to 21d are attracted to the closest S pole on the associated annular end face 11b in the rotational direction. As a result, the main rotor arms 19a to 19d, the rotor arms 21a to 21d and the rotary shaft 17 are rotated rightward by one step and stopped at the stable position (FIG. 4C).

Thereafter, every time the direction of the current to the coil 13 is changed, the main rotor arms 19a to 19d, the rotor arms 21a to 21d and the rotary shaft 17 repeat the stepwise rotation of turning rightward by one step and stopping at the stable position (FIG. 4D to FIG. 5E). That is, the drive shafts 17a and 17b of the electromagnetic actuator 10 are rotated rightward step by step of 45° every time the direction of the current to the coil 13 is changed.

Although the offset angle α of the rotational-direction determining rotor arm 21d is set to 22.5° in the embodiment, it is possible to achieve leftward rotation by changing the offset angle α to a predetermined range. In the illustrated embodiment, the offset angle α of the rotational-direction determining rotor arm 21d and the rotational direction has the following relationship. Note that the offset angle α is positive for the angle measured leftward from the pitch angle (phase) of the main rotor arms and is negative for the angle measured rightward from the pitch angle.

| | |
|---|---|
| 0° < α < 45° | rightward rotation |
| 45° < α < 90° | leftward rotation |
| 0° > α > −45° | leftward rotation |
| −45° > α > −90° | rightward rotation |

When the offset angle α is 0°, 45° (=90°/2) and 90°, whether to rotate rightward or leftward is not settled.

The number of segmented magnetic poles of the stator 11, the number of poles of the main rotor arms and the number of poles of the rotational-direction determining rotor arm 21d are not limited to those of the embodiment. Although the rotational-direction determining rotor arm 21d is provided only at the second rotor arm 21 in the illustrated embodiment, the first rotor arm 19 may be constructed in the same way as the second rotor arm 21. Further, the number of poles of the main rotor arms of the second rotor arm 21 may be set equal to the number of poles of the main rotor arms of the first rotor arm 19, and the rotational-direction determining rotor arm may be provided between the adjacent two of the main rotor arms of either rotor arm.

The rotational-direction determining rotor arm should not necessarily be one, but plural rotational-direction determining rotor arms may be provided. The number and the shape or so of the rotational-direction determining rotor arms have only to be set so that the main rotor arms do not stop at the center of each magnetic pole of the stator or at the boundary between the magnetic poles of the stator.

Although the number of segmented magnetic poles of the stator 11 is set to "8" and the number of poles of the first and second rotor arms (the rotor arms 19a to 19d and 21a to 21d) is set to "8" in the illustrated embodiment, the invention is not limited to this case. Given that the number of segmented magnetic poles of the stator 11 is m, the numbers of poles of the first and second rotor arms, $X_1$ and $X_2$ become equal to or less than m/2. The rotational step angle of the rotor can be made smaller by increasing the number of segmented magnetic poles of the stator.

The number of magnetic poles, Y, of the rotational-direction determining rotor arm which determines the rotational direction is not limited because they should only shift the magnetic poles of the first and second rotor arms in a given direction from the center of each magnetic pole of the stator. The number of magnetic poles Y is however normally $1 \leq Y < (X_1 + X_2)$. The optimal number of magnetic poles Y of the rotational-direction determining rotor arm is set based on the material, shape and so forth of the rotational-direction determining rotor arm.

Figure 6:
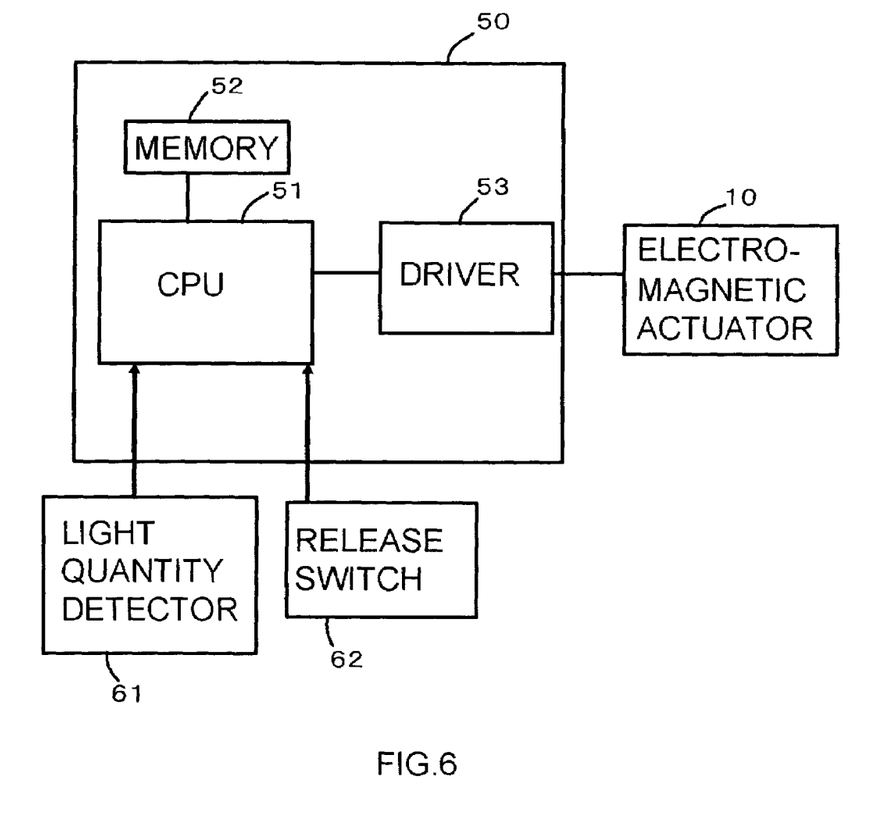
FIG. 6 is a block diagram of a control circuit which controls the electromagnetic actuator in FIG. 1.

FIG. 6 presents a block diagram of a control circuit in case where the electromagnetic actuator 10 is adapted to an aperture device for a camera as a portable device. A control unit 50 has a CPU (Central Processing Unit) 51, a memory 52 and a driver 53. The CPU 51 performs the general control of the electromagnetic actuator and arithmetic operations. A program and control information for controlling the electromagnetic actuator 10 are stored in the memory 52. The driver 53 supplies a positive or negative drive current to the coil 13 and excites the coil 13 according to a control signal from the CPU 51.

When a release switch 62 is depressed, the CPU 51 reads luminance information of a shooting target, which is detected by a light quantity detector 61, and discriminates whether the electromagnetic actuator 10 should be driven (the amount of exposure by the aperture should be restricted) or not. When the aperture action is needed according to the discrimination result, therefore, the CPU 51 instructs the driver 53 to output the positive or negative current to drive the electromagnetic actuator 10. In response to the instruction, the driver 53 supplies the positive or negative current to the coil 13 of the electromagnetic actuator 10.

The control of the energization of the coil 13 of the electromagnetic actuator 10 this way allows the rotor 20 and the rotary shaft 17 to take a rotational motion in a same direction.

Figure 7:
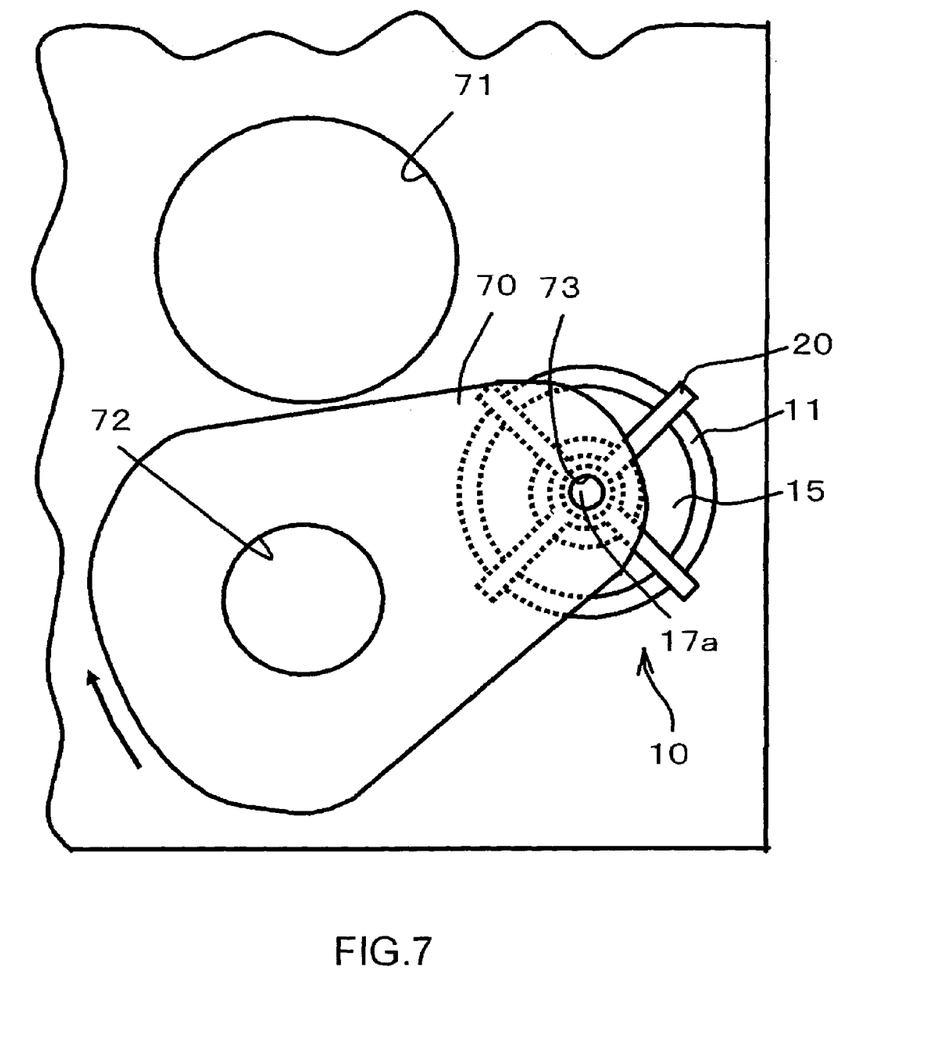
FIG. 7 is a plan view of an aperture device for a camera, which uses the electromagnetic actuator in FIG. 1.

The aperture device for a camera which uses the electromagnetic actuator 10 will be described referring to FIG. 7. The aperture device has the control unit 50, the light quantity detector 61 and the release switch 62 in FIG. 6. The aperture device controls the light quantity by restricting a lens aperture 71 as the lens aperture 71 is placed over an aperture 72 smaller in diameter than the lens aperture 71 by turning an aperture blade 70.

The aperture 72 smaller in diameter than the lens aperture 71 and a fitting hole 73 are formed in the aperture blade 70. The drive shaft 17a of the electromagnetic actuator 10 is fitted in the fitting hole 73 of the aperture blade 70, so that the aperture blade 70 is secured to the drive shaft 17a. As the rotary shaft 17 rotates, therefore, the aperture blade 70 rotates too. Further as a plurality of various apertures 72 smaller in diameter than the lens aperture 71 are formed in the aperture blade 70 around the drive shaft 17a, an aperture device which restricts the lens aperture 71 in various steps can be provided.

Figure 9:
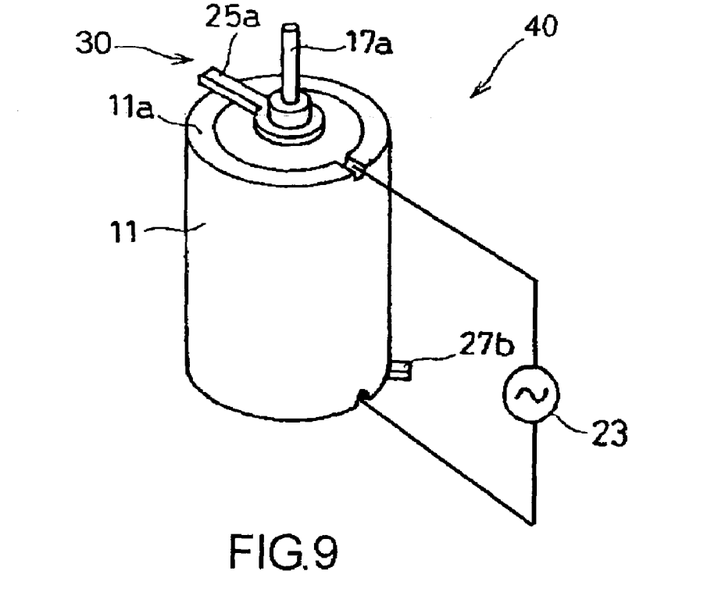
FIG. 9 is a perspective view of the electromagnetic actuator in FIG. 8 assembled and as seen from the front side.
Figure 10:
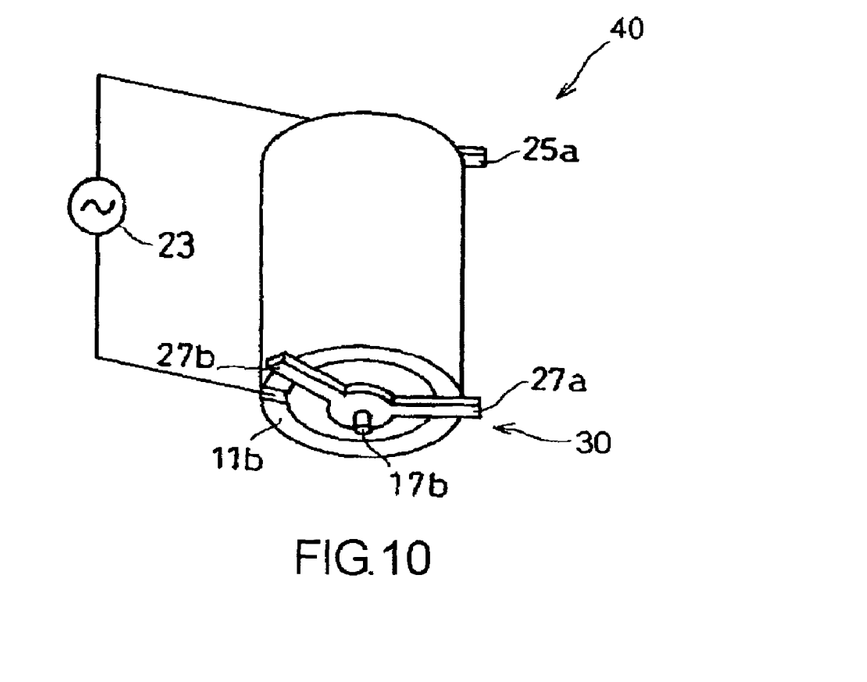
FIG. 10 is a perspective view of the electromagnetic actuator in FIG. 8 assembled and as seen from the rear side.

FIGS. 8, 9 and 10 illustrate an electromagnetic actuator 40 according to another embodiment which is comprised of the minimum number of rotor arms and can achieve the invention. The embodiment has a rotor 30 which has a single rotor arm 25 (a main rotor arm 25a) at one end portion of the rotary shaft 17, and two rotor arms 27 (a main rotor arm 27a and a rotational-direction determining rotor arm 27b) at the other end portion. The other structure of the electromagnetic actuator according to this embodiment of the invention is the same as that of the embodiment shown in FIGS. 1, 2 and 3. The main rotor arms 25a and 27a are formed in phase with each other. The rotational-direction determining rotor arm 27b is formed in such a way that the phase is shifted by a predetermined offset angle $\alpha_2$ from the phase of the main rotor arm 27a so that the rotational-direction determining rotor arm 27b is not in phase with the main rotor arms 25a and 27a. The offset angle $\alpha_2$ is at least $\alpha_2 \neq 0°$ and $\alpha_2 \neq 180°$ and is set so that at the stable position, the main rotor arms are not positioned at the middle of each magnetic pole and at the boundary between the magnetic poles.

In this embodiment too, when an AC current or the direction of the current that changes its positive/negative polarity every predetermined time is let to flow across the coil, the rotor arms and the rotary shaft 17 rotate in a given direction step by step of 45° every time the direction of the current to the coil is changed.

Because the coil 13 is wound in such a way as to surround the rotary shaft 17, thereby making it possible to reduce the overall diameter of the electromagnetic actuator, according to the embodiments of the invention, the radial-directional space can be made wider.

The number of turns can be increased easily without changing the diameter by making the coil 13 longer in the axial direction, and the permanent magnet constituting the stator 11 is formed cylindrical and extending in the axial direction. This makes the magnetic force stronger, so that the rotational torque and the detent torque can be made greater.

As the rotor 20 is constructed by rotor arms, the moment of inertia of the rotor 20 becomes smaller, thus making it possible to reduce the power consumed when the electromagnetic actuator is activated.

A portable device according to any embodiment of the invention can be made smaller in size and lighter by reducing the size of the electromagnetic actuator 10 in the radial direction. As the portable device according to the embodiment has the electromagnetic actuator 10 which generates a sufficient rotational torque and has smaller power consumption, the performance can be enhanced.

Although the portable device according to the embodiment has been described as an aperture device for a camera, the invention can be adapted to any portable device with an electromagnetic actuator, such as a shutter device for a camera, a lens driving device, a wristwatch or a portable telephone.

Although the rotor arms are rotated in the above-described embodiments, an electromagnetic actuator according to a further embodiment of the invention may be designed in such a way that the rotary shaft and the rotor arms are fixed while a cylindrical permanent magnet separated to segments which are magnetized to a plurality of poles is rotated as a rotor. In this case, as the coil rotates together with the permanent magnet, a current is supplied to the coil by means of a brush structure or so.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-368600 filed on Oct. 29, 2003, and including the specification, claims, drawings and summary. The disclosure of the above Japanese Patent Application is incorporated herein by reference in its entirety.

What is claimed is:

1. An electromagnetic actuator comprising:
a cylindrical stator permanent magnet having annular end faces magnetized to a plurality of magnetic poles;
a coil securely disposed inside a hollow interior of said stator;
a rotary shaft put through said coil in a direction of a center axis thereof in such a way as to be rotatably supported; and
a rotor of a soft magnetic material having a plurality of rotor arms facing said annular end faces of said stator and provided in such a way as to rotate together with said rotary shaft,
wherein said rotor arms include at least two main rotor arms and at least one rotational-direction determining rotor arm which extend in a direction of said annular end faces of said stator from both end portions of said rotary shaft and face said annular end faces, said at least one rotational-direction determining rotor arm is less in quantity than said main rotor arms rotor, those rotor arms which are disposed at one of said annular end faces are arranged in phase with magnetic poles of the facing annular end face, those rotor arms which are disposed at the other annular end face are arranged in an opposite phase to said phase with respect to magnetic poles of the facing annular end face, and said rotational-direction determining rotor arm is so arranged as to be shifted by a given angle with respect to said magnetic poles of the facing annular end face.

2. The electromagnetic actuator according to claim 1, wherein said rotational-direction determining rotor arm is formed as a separate member from said main rotor arms.

3. The electromagnetic actuator according to claim 1, wherein said rotor arms which are disposed at said one of said annular end faces include four rotor arms arranged at angles of 90 degrees from one another,
said rotor arms which are disposed at said other annular end face include three rotor arms in such a way that angles defined by a center one of said three rotor arms and the other two rotor arms are 90 degrees, and
said rotational-direction determining rotor arm is arranged at said other annular end face between said other two rotor arms.

4. An electromagnetic actuator comprising:
a cylindrical stator permanent magnet having annular end faces magnetized to a plurality of magnetic poles;
a coil securely disposed inside a hollow interior of said stator;
a rotary shaft put through said coil in a direction of a center axis thereof in such a way as to be rotatably supported; and
a rotor of a soft magnetic material having a plurality of rotor arms facing said annular end faces of said stator and provided in such a way as to rotate together with said rotary shaft,
further comprising a coil bobbin on which said coil is wound and which is secured to said hollow interior of said stator, and said coil bobbin constitutes a bearing which supports said rotary shaft in a rotatable manner.

5. A portable device having an electromagnetic actuator which comprises:
a cylindrical stator permanent magnet having annular end faces magnetized to a plurality of magnetic poles;
a coil securely disposed inside a hollow interior of said stator;
a rotary shaft put through said coil in a direction of a center axis thereof in such a way as to be rotatably supported; and
a rotor of a soft magnetic material having a plurality of rotor arms facing said annular end faces of said stator and provided in such a way as to rotate together with said rotary shaft,
wherein said rotor arms include at least two main rotor arms and at least one rotational-direction determining rotor arm which extend in a direction of said annular end faces of said stator from both end portions of said rotary shaft and face said annular end faces, said at least one rotational-direction determining rotor arm is less in quantity than said main rotor arms rotor, those rotor arms which are disposed at one of said annular end faces are arranged in phase with magnetic poles of the facing annular end face, those rotor arms which are disposed at the other annular end face are arranged in an opposite phase to said phase with respect to magnetic poles of the facing annular end face, and said rotational-direction determining rotor arm is so arranged as to be shifted by a given angle with respect to said magnetic poles of the facing annular end face.

* * * * *